United States Patent
Suarez (10) Patent No.: US 11,861,434 B2
(45) Date of Patent: Jan. 2, 2024

(54) IMAGE PROCESSING APPARATUS, IMAGE FORMING APPARATUS, AND IMAGE PROCESSING METHOD FOR DRAWING ON CROSS-SECTION TO BE TRIMMED

(71) Applicant: KYOCERA Document Solutions Inc., Osaka (JP)

(72) Inventor: Anthony Suarez, Martinez, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/496,625

(22) Filed: Oct. 7, 2021

(65) Prior Publication Data

US 2023/0111539 A1 Apr. 13, 2023

(51) Int. Cl.
*G06K 15/00* (2006.01)
*G06K 15/02* (2006.01)

(52) U.S. Cl.
CPC ....... *G06K 15/403* (2013.01); *G06K 15/1868* (2013.01)

(58) Field of Classification Search
CPC .......................... G06K 15/403; G06K 15/1868
See application file for complete search history.

(56) References Cited

U.S. PATENT DOCUMENTS

| 4,427,290 | A | * | 1/1984 | Kaye | G03G 15/6538 |
| | | | | | 283/117 |
| 6,048,114 | A | * | 4/2000 | de Troz | B42D 1/009 |
| | | | | | 400/27 |
| 2006/0231997 | A1 | * | 10/2006 | Meunier | G06K 1/121 |
| | | | | | 270/52.02 |
| 2009/0039583 | A1 | * | 2/2009 | Horn | G03G 21/14 |
| | | | | | 270/52.02 |
| 2011/0221846 | A1 | * | 9/2011 | Smith | G06K 1/121 |
| | | | | | 235/462.15 |
| 2014/0374980 | A1 | * | 12/2014 | De Monet | G06K 15/107 |
| | | | | | 270/1.01 |
| 2021/0287060 | A1 | * | 9/2021 | Ueno | G06K 15/1809 |

FOREIGN PATENT DOCUMENTS

JP 2006-056068 A 3/2006

* cited by examiner

*Primary Examiner* — Nicholas Pachol
(74) *Attorney, Agent, or Firm* — Hawaii Patent Services; Nathaniel K. Fedde; Kenton N. Fedde (57) ABSTRACT

Provided is an image processing apparatus that draws a cross-section to be trimmed. The data position acquisition unit acquires the print data and the position of the cut line trimmed after printing with the print data. The cross-section drawing unit draws, for each page of the print data, a fragment text and/or image visible on trimmed cross-section from the position of the cut line acquired by the data position acquisition unit to a specific range. At this time, the cross-section drawing unit may draw the fragment when the print data has equal or greater than a specific number of pages. Further, the cross-section drawing unit may adjust drawing of the fragment according to thickness of recording paper to be printed.

16 Claims, 10 Drawing Sheets

IMAGE PROCESSING APPARATUS, IMAGE FORMING APPARATUS, AND IMAGE PROCESSING METHOD FOR DRAWING ON CROSS-SECTION TO BE TRIMMED

BACKGROUND

The present disclosure particularly relates to an image processing apparatus, an image forming apparatus, and an image processing method for processing an image for printed matter printed on a plurality of pages.

There are image forming apparatuses such as multifunctional peripherals (MFPs) that can print documents and images.

As a typical technique, a technique for printing on a spine or small-lot printing using a so-called borderless printable personal inkjet recording device is described. In this technique, when performing small-lot printing, the ink with the smallest amount of ink that can be printed is used regardless of the amount of ink in normal printing operations. In addition, when performing small-lot printing, the speed is different from that of normal printing. As a result, the title and index of the sentence can be easily printed.

SUMMARY

An image processing apparatus according to the present disclosure is an image processing apparatus including: a data position acquisition unit that acquires print data and position of cut line to be trimmed after printing with the print data; and a cross-section drawing unit that draws, for each page of the print data, a fragment of text and/or image visible on trimmed cross-section from the position of the cut line acquired by the data position acquisition unit to a specific range.

An image forming apparatus according to the present disclosure is an image forming apparatus including: a data position acquisition unit that acquires print data and position of cut line to be trimmed after printing with the print data; a cross-section drawing unit that draws, for each page of the print data, a fragment of text and/or image visible on trimmed cross-section from the position of the cut line acquired by the data position acquisition unit to a specific range; and an image forming unit that forms an image of the print data and the fragment drawn by the cross-section drawing unit for each page.

An image processing method according to the present disclosure is an image processing method executed by an image processing apparatus, including the steps of: acquiring print data and position of cut line to be trimmed after printing with the print data; and drawing, for each page of the print data, a fragment of text and/or image visible on trimmed cross-section from acquired position of the cut line to a specific range.

DETAILED DESCRIPTION

Embodiment

[Control Configuration of Image Forming Apparatus 1]

Figure 1:
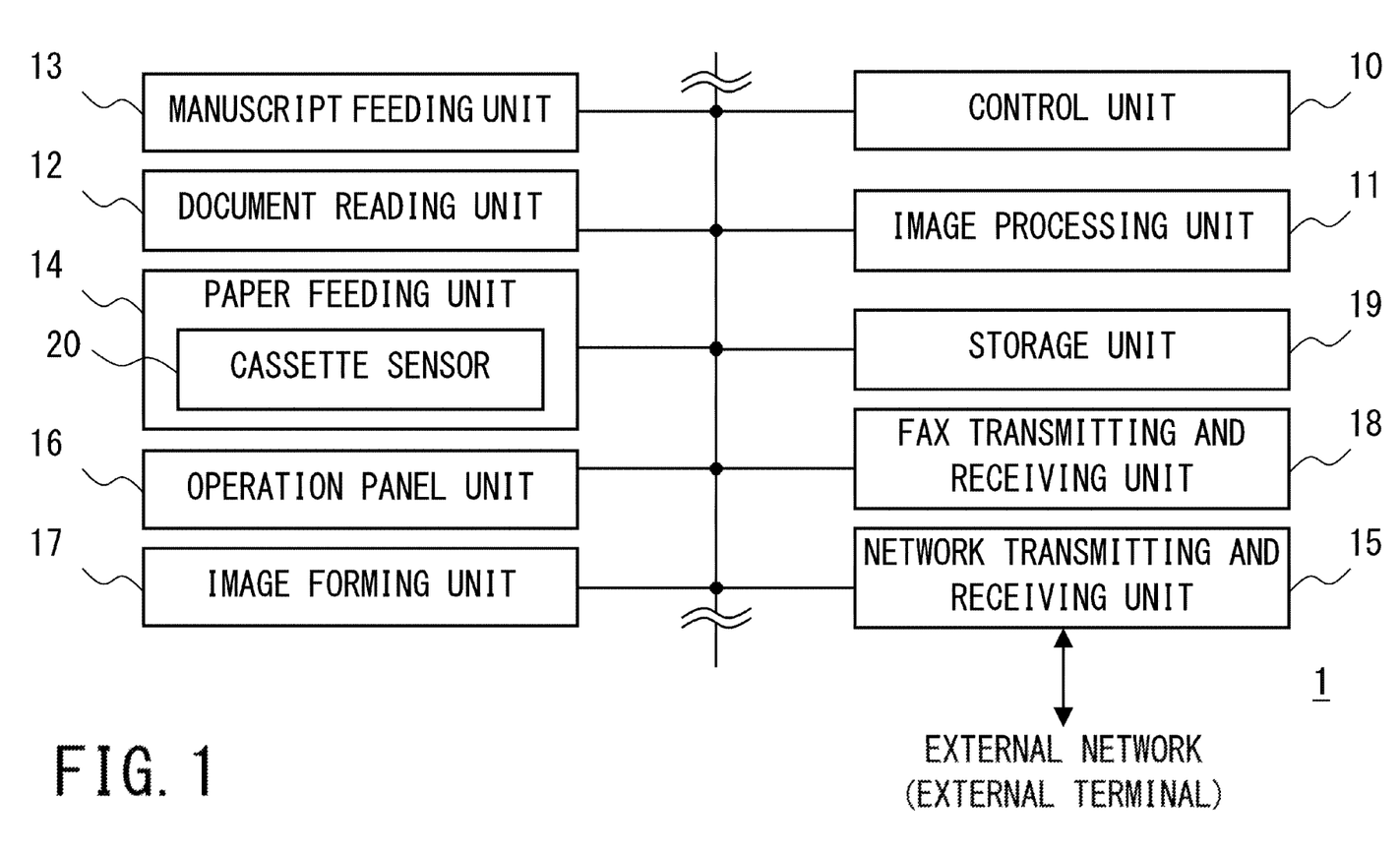
FIG. 1 is a block diagram showing a control configuration of an image forming apparatus according to an embodiment of the present disclosure.

Firstly, with reference to FIG. 1, a control configuration of the image forming apparatus 1 according to the present embodiment is described.

The image forming apparatus 1 is an MFP, a printer, a digital printing apparatus for production printing, or the like.

In this embodiment, an example in which the image forming apparatus 1 is an MFP for business is mainly described.

The image forming apparatus 1 includes a control unit 10, an image processing unit 11, a document reading unit 12, a document feeding unit 13, a paper feeding unit 14, a network transmitting and receiving unit 15, an operation panel unit 16, an image forming unit 17, a fax transmitting and receiving unit 18, storage unit 19, and the like. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for specific applications), or the like.

The control unit 10 reads a control program stored in a ROM or a HDD of the storage unit 19, by executing with developing the control program on the RAM, and it is operated as each unit of the functional blocks to be described later. Further, the control unit 10 controls the entire apparatus according to instruction information input from an external terminal or an operation panel unit 16.

The image processing unit 11 is a control calculation part such as a DSP (Digital Signal Processor), a GPU (Graphics Processing Unit), ASIC, or the like. The image processing unit 11 performs image processing on the image data. This image processing may be, for example, processing such as enlargement/reduction, density adjustment, gradation adjustment, image improvement, or the like.

Figure 2:
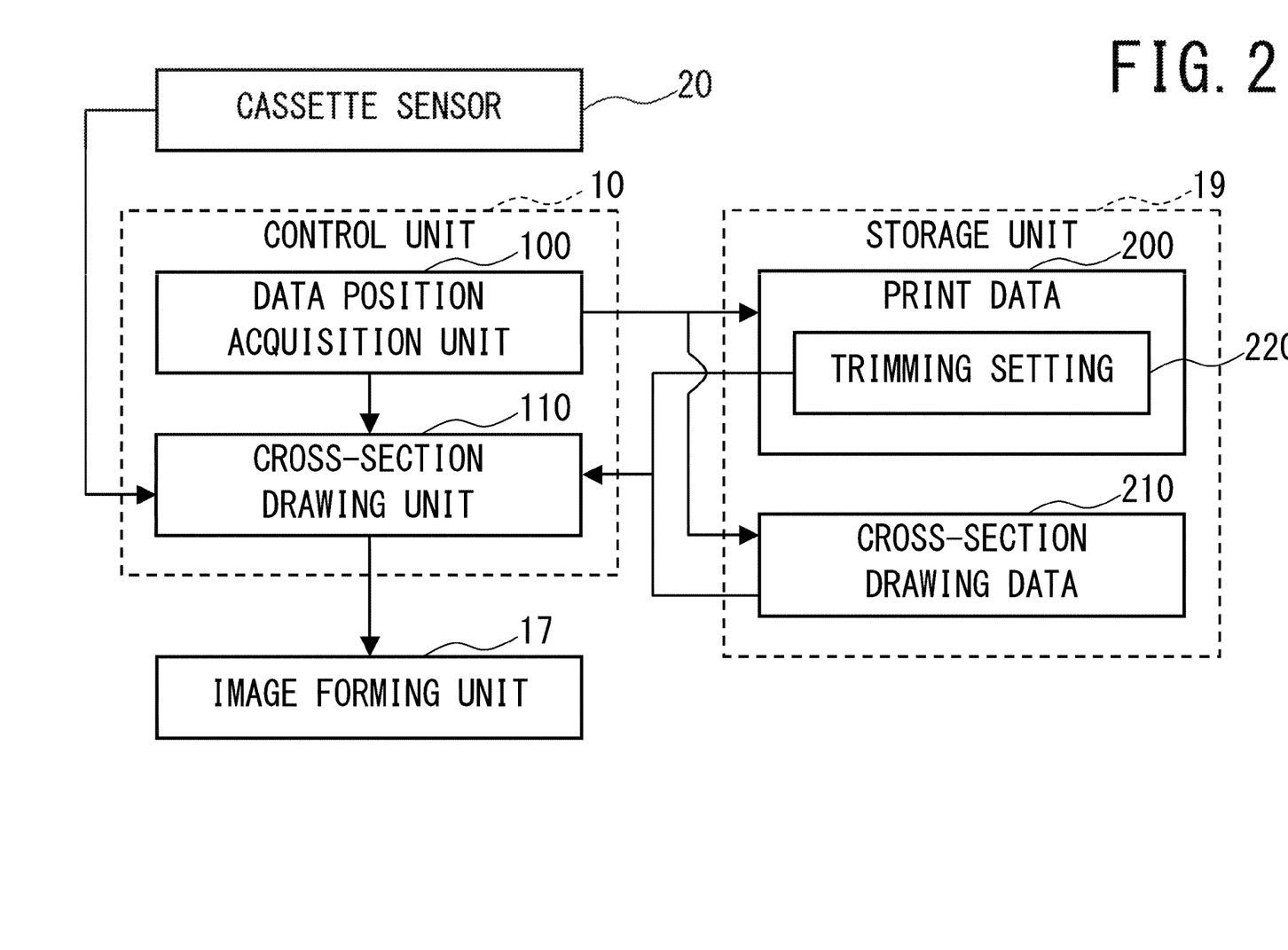
FIG. 2 is a block diagram showing a functional configuration of the image forming apparatus according to the embodiment of the present disclosure.

Further, the image processing unit 11 stores the image read by the document reading unit 12 in the storage unit 19 as print data 200 (FIG. 2). At this time, the image processing unit 11 can also convert the print data 200 into an electronic document such as PDF or an image data file such as TIFF. Further, the image processing unit 11 may be able to execute at least a part of OCR (Optical Character Recognition) processing.

The document reading unit 12 reads the set document. Further, the document reading unit 12 is arranged above the main body of the image forming apparatus 1.

The document reading unit 12 includes a scanner, platen glass, and a document reading slit. When reading a document placed on the platen glass, the document reading unit 12 moves the scanner to a position facing the platen glass and scans the document placed on the platen glass to obtain image data. Then, the acquired image data is stored in the storage unit 19 as the print data 200 (FIG. 2).

Further, the document reading unit 12 moves the scanner to a position facing the document reading slit when reading the document supplied from the document feeding unit 13. Then, the document reading unit 12 reads the document through the document reading slit in synchronization with the document transport operation by the document feeding unit 13 to acquire image data. The document reading unit 12 stores the acquired image data in the storage unit 19 as the print data 200.

The document feeding unit 13 conveys the document read by the document reading unit 12. The document feeding unit 13 is arranged above the document reading unit 12.

The document feeding unit 13 includes a document placing unit and a document transporting mechanism. The document feeding unit 13 feeds the documents placed on the document loading unit to the document reading unit 12 one by one by the document transport mechanism.

The paper feeding unit 14 feeds the recording paper placed on any of the plurality of paper trays one by one toward the image forming unit 17. The paper feeding unit 14 is provided in the main body unit.

Further, in the present embodiment, the paper feeding unit 14 includes a cassette sensor 20 for each paper tray.

The cassette sensor 20 is a measuring unit that measures the amount of recording paper placed on the paper tray. In the present embodiment, the cassette sensor 20 accurately measures the height in the thickness direction of the recording paper by, for example, ultrasonic waves, a laser, or the like. Alternatively, as the cassette sensor 20, a measuring unit that can calculate the thickness of the printed paper by the sensor for measuring the weight of the recording paper, the set paper size and the standard weight (kg) for the cassette, or the like, may be used.

The network transmitting and receiving unit 15 is a network connection unit including a LAN board, a wireless transceiver, and the like for connecting to an external network. The external network of the present embodiment is, for example, a LAN (Local Area Network), a wireless LAN (Wi-Fi), a WAN (Wide Area Network), a mobile phone network, a voice phone network, or the like.

The network transmitting and receiving unit 15 transmits/receives data on a data communication line, and it transmits/receives a voice signal on a voice telephone line.

In the present embodiment, the image forming apparatus 1 may be connected to an external PC (Personal Computer), a smartphone, a mobile phone, a dedicated terminal, or the like (hereinafter, simply referred to as the "external terminal") via the external network.

The operation panel unit 16 includes an input unit such as a button, a touch panel, or the like, and a display unit such as an LCD (Liquid Crystal Display), an organic EL (Electro Luminescence) display, or the like. Further, the operation panel unit 16 is arranged on the front side of the image forming apparatus 1.

The input unit of the operation panel unit 16 includes a numeric keypad, a start button, a cancel button, an operation mode switching button, a button for instructing job execution, and the like. In the present embodiment, the operation mode of the image forming apparatus 1 includes types such as copying, fax transmission, a scanner, and a network scanner, or the like. The jobs also include types such as printing, sending, saving, recording, or the like, for the selected document. The input unit of the operation panel unit 16 can acquire instructions for various jobs of the image forming apparatus 1 by the user.

The information of each user can be inputted or changed according to the user's instruction acquired from the operation panel unit 16.

The image forming unit 17 forms an image on the recording paper from the data stored in the storage unit 19, read by the document reading unit 12, or acquired from the external terminal according to the output instruction of the user.

The image forming unit 17 includes a photoconductor drum, an exposure unit, a developing unit, a transfer unit, a fixing unit, and the like. The image forming unit 17 records a toner image on a recording paper by executing an image forming process including charging, exposure, development, transfer, and fixing.

Alternatively, the image forming unit 17 may include an inkjet head for business use. In this case, the ink ejected from the inkjet head records an ink image on the recording paper.

The FAX transmitting and receiving unit 18 transmits/receives a facsimile. The FAX transmitting and receiving unit 18 can receive a facsimile from another FAX apparatus via a voice line, store the reception data in the storage unit 19 as the print data 200 (FIG. 2), and cause the image forming unit 17 to form the image. Further, the FAX transmitting and receiving unit 18 can convert the document read by the document reading unit 12 and the network FAX data transmitted from the external terminal into image data and facsimile-transmit to another FAX apparatus via a voice line.

The storage unit 19 is a non-transitory recording medium including a semiconductor memory such as a ROM (Read Only Memory), a RAM (Random Access Memory), or the like, or an HDD (Hard Disk Drive), or the like.

The RAM of the storage unit 19 may keep the stored contents by a function such as self-refreshing even in a power saving state.

A control program for controlling the operation of the image forming apparatus 1 is stored in the ROM or HDD of the storage unit 19. In addition to this, the storage unit 19 also stores the user's account settings. Further, the storage unit 19 may include an area of a storage folder for each user.

In addition, besides this, the image forming apparatus 1 may include a post-processing device that performs post-processing (after treatment) by a stapler that collects printed matter, a cutter that cuts printed matter, and the like. Alternatively, the image forming apparatus 1 may include a printed matter transport unit that transports the printed matter to a post-processing apparatus, which is a dedicated apparatus for performing post-processing.

Further, in the image forming apparatus 1, the control unit 10 and the image processing unit 11 may be integrally formed such as a CPU with built-in GPU, a chip-on module package, an SOC (System On a Chip), or the like.

Further, the control unit 10 and the image processing unit 11 may have a built-in RAM, ROM, flash memory, or the like.

[Functional Configuration of Image Forming Apparatus 1]

Here, with reference to FIG. 2, a functional configuration of the image forming apparatus 1 is described.

The control unit 10 of the image forming apparatus 1 includes a data position acquisition unit 100 and a cross-section drawing unit 110.

The storage unit 19 stores the print data 200 and the cross-section drawing data 210.

The data position acquisition unit 100 acquires the print data 200 and the position of the cut line to be trimmed after printing with print data 200.

The cross-section drawing unit 110 draws a fragment of characters and/or image that can be viewed on the cross-section after trimming. Here, the cross-section drawing unit 110 draws this fragment for each page of the print data 200 acquired by the data position acquisition unit 100. The cross-section drawing unit 110 draws, for example, a fragment of rectangular shape to a specific range from the position of the cut line acquired by the data position acquisition unit 100.

At this time, the cross-section drawing unit 110 draws the fragment only when the print data 200 has equal or greater than a specific number of pages.

In addition, in the present embodiment, the cross-section drawing unit 110 can adjust the drawing of the fragment according to the thickness of the recording paper to be printed. Thus, in this embodiment, the measured value of the cassette sensor 20 is used.

Further, the cross-section drawing unit 110 can improve the visibility of the character and/or image drawn on the cross-section by drawing the fragment in a darker color than a usual color. For example, in order to perform this dark color drawing, the cross-section drawing unit 110 may adjust the dithering density to be darker, or it may increase the density adjusted in the image forming unit 17 regardless of the eco-setting, or the like.

The print data 200 is various data for printing. The print data 200 may be, for example, electronic document data such as PDF (Portable Document Format), or the like, PS (Post Script) data, other vector data, bitmap data, files of various application software (hereinafter, referred to as "application"), or the like.

Alternatively, the print data 200 is described in, for example, JDF (Job Description Format) and/or JMF (Job Messaging Format), and the above-mentioned PDF, PS, application data, after-printing adjustment data, account control data, or the like, may be summarized.

In addition, the print data 200 includes a trimming setting 220.

The trimming setting 220 is data indicating each attribute in printing. In the present embodiment, the trimming setting 220 includes, for example, page number data. Further, the trimming setting 220 may include data such as a cut line, a register mark (trimming mark), a folding position, an imposition position, a milling process designation, and a trimming (cutting) width. Of these, the cut line indicates the position to be trimmed after printing with the print data 200.

Further, in the present embodiment, the trimming setting 220 also includes post-processing setting data. In the present embodiment, the post-processing also includes processing for bundling a bundle of printed matter on which the print data 200 is printed (hereinafter, simply referred to as a "printed matter") by staples, stitches, spiral bindings, ring bindings, or other methods.

In addition, the print data 200 itself may include vector or bitmap image data of the register mark, or the like. Even in this case, the trimming setting 220 may have another value set as the position of the cut line.

The cross-section drawing data 210 is data of text and/or an image drawn on the cross-section for trimming when the print data 200 is printed. Further, in the case of text, the cross-section drawing data 210 may include setting data such as a font, a color, or the like. Further, in the case of an image, the cross-section drawing data 210 may include setting data of information such as an image format including a type of bitmap or vector data, the number of colors, or the like. Further, the cross-section drawing data 210 may also include setting data of the position on the cross-section. This setting data of the position may include the setting of the margin from the upper, lower, left, or right edge on the cross-section, the left alignment, the center alignment, the right alignment, and the like.

In addition, the cross-section drawing data 210 may be attached to or included in the print data 200, or it may be set and stored in the storage unit 19 by the printing user. Further, the section drawing data 210 may be set in association with the account setting.

Here, the control unit 10 of the image forming apparatus 1 is made to function as the data position acquisition unit 100 and the cross-section drawing unit 110 by executing the control program stored in the storage unit 19.

Further, each part of the image forming apparatus 1 described above becomes a hardware resource for executing the image processing method according to the present disclosure.

In addition, a part or any combination of the above-mentioned functional configurations may be configured in terms of hardware or circuit by IC, programmable logic, FPGA (Field-Programmable Gate Array), or the like.

[Cross-Section Drawing Process by Image Forming Apparatus 1]

Figure 3:
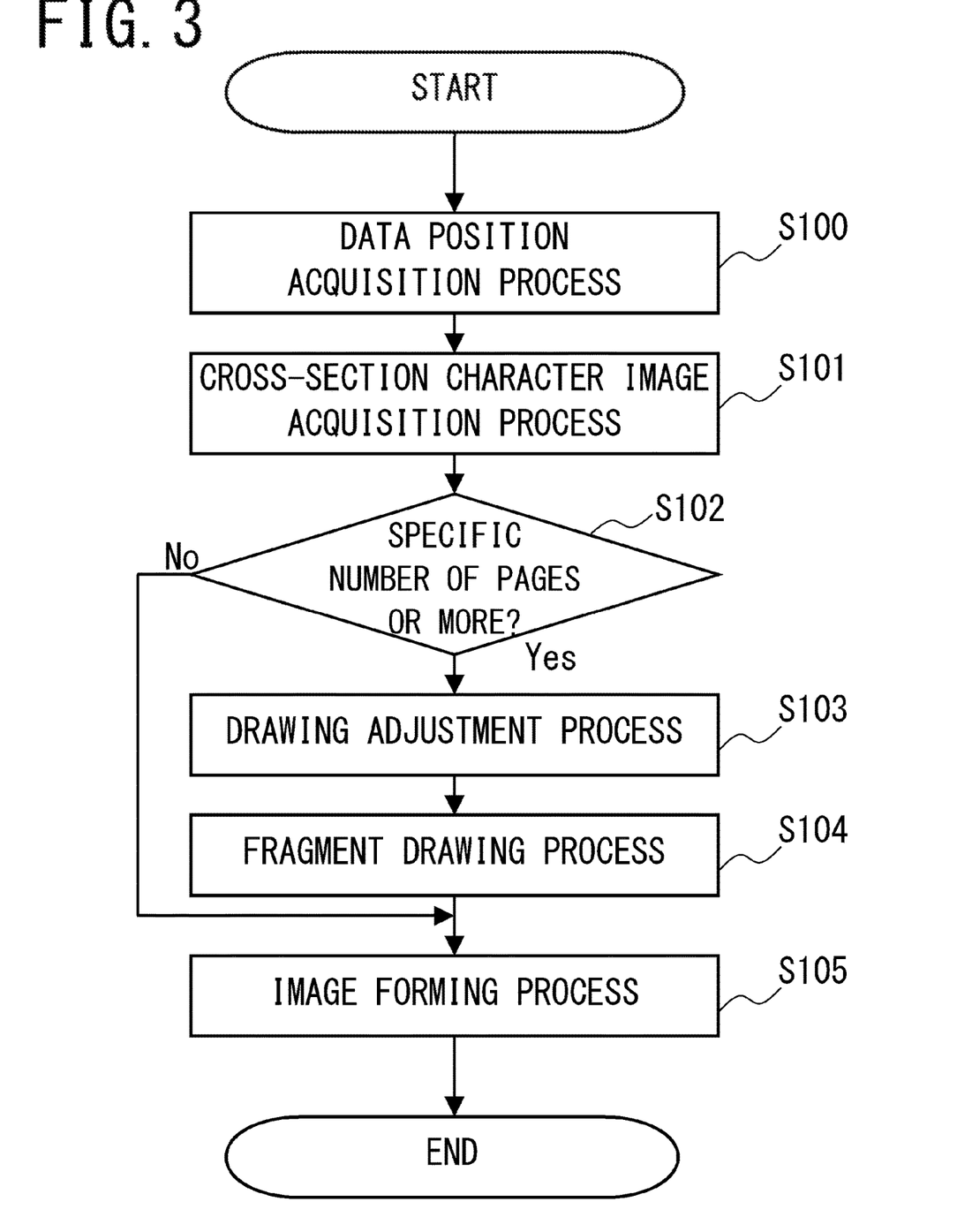
FIG. 3 is a flowchart of the cross-section drawing process according to the embodiment of the present disclosure.
Figure 4:
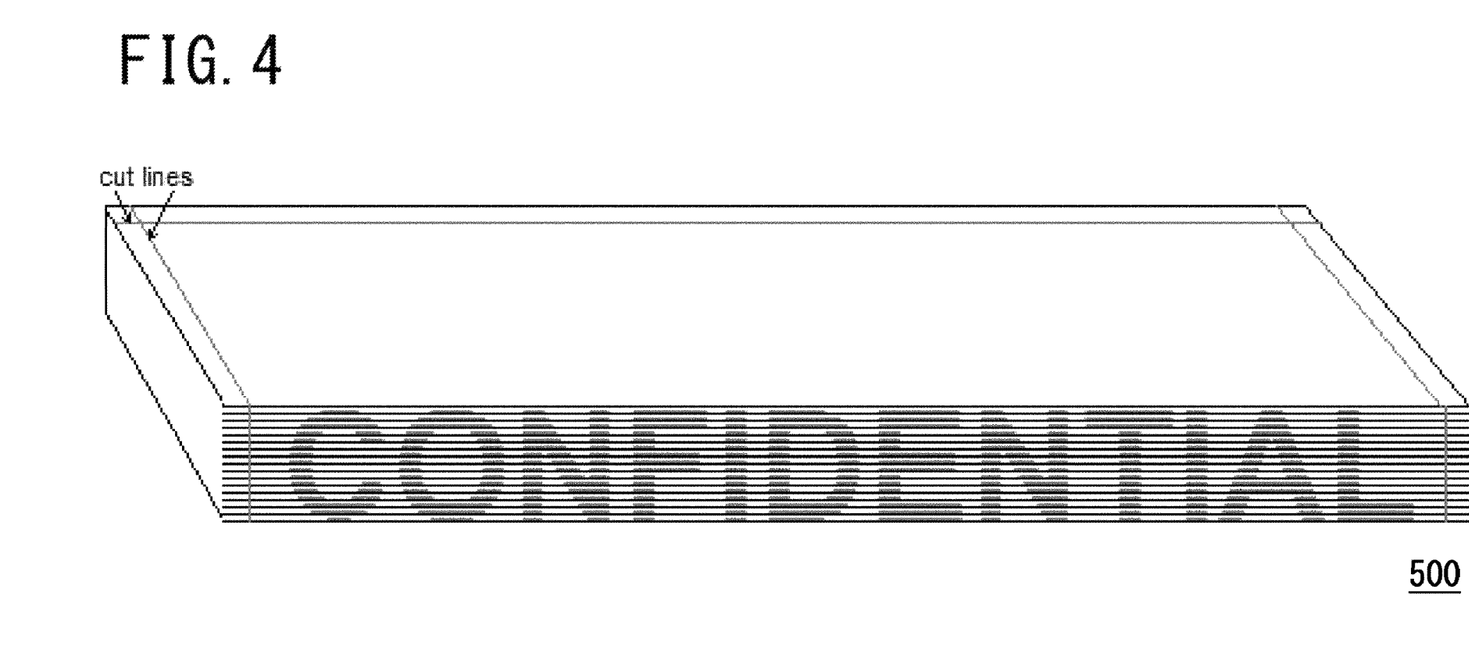
FIG. 4 is a conceptual diagram of drawing a cross-section by the cross-section drawing process as shown in FIG. 3.
Figure 5:
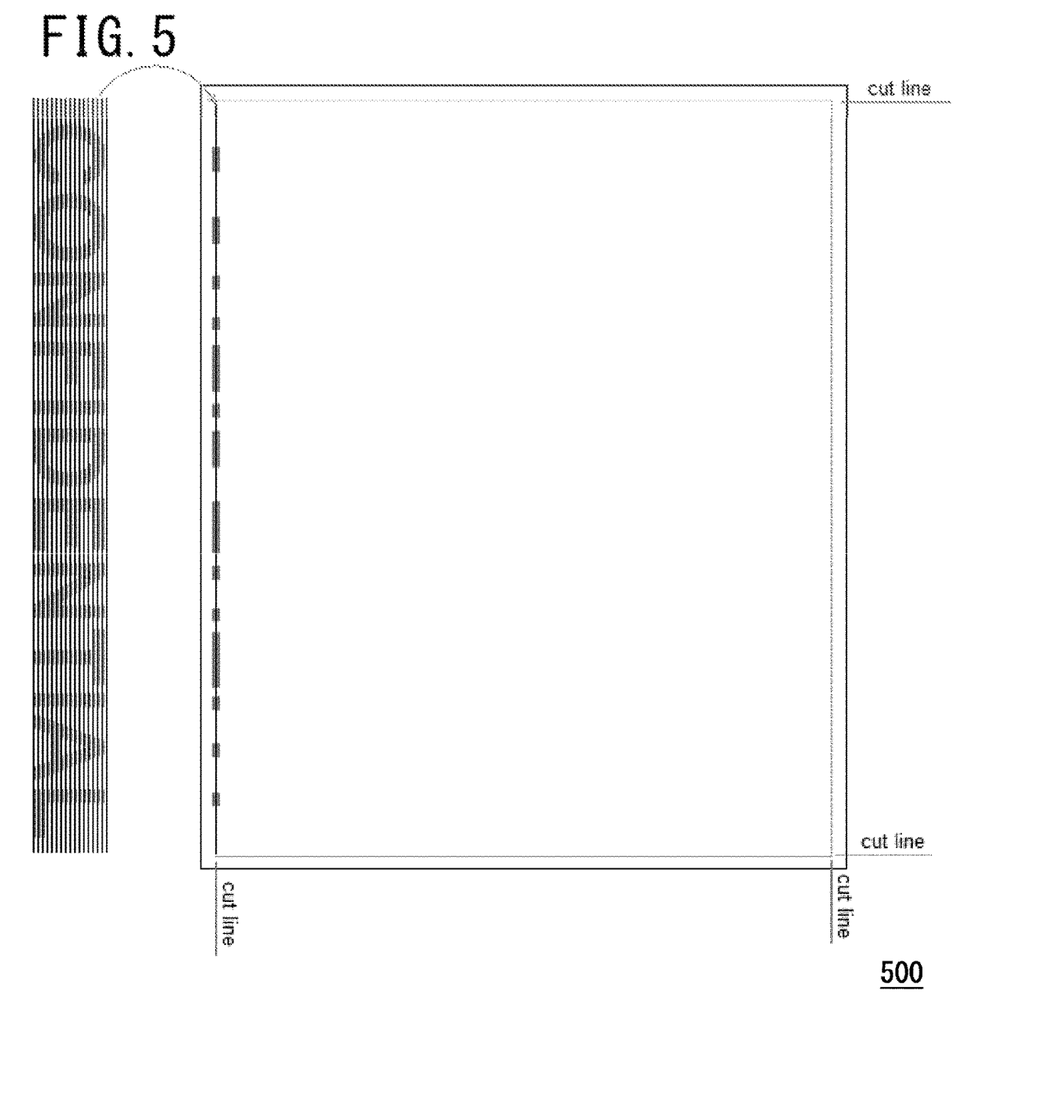
FIG. 5 is a conceptual diagram of drawing a fragment by the cross-section drawing process as shown in FIG. 3.

Next, with reference to FIGS. 3 to 5, a cross-section drawing process by the image forming apparatus 1 according to the embodiment of the present disclosure is described.

In the cross-section drawing process of the present embodiment, the print data 200 is acquired. Then, for each page of the print data 200, fragments of characters and/or image that can be viewed in the cross-section after trimming are drawn in a specific range from the position of the cut line. The print data 200 on which the fragment is drawn is formed as an image on the recording paper.

In the cross-section drawing process, the control unit 10 mainly executes the program stored in the storage unit 19 in cooperation with each unit and uses the hardware resources.

Hereinafter, with reference to the flowchart of FIG. 3, the details of the cross-section drawing process according to the present embodiment is described step by step.

(Step S100)

Firstly, the data position acquisition unit 100 performs the data position acquisition process.

The data position acquisition unit 100 acquires the print data 200.

Specifically, the data position acquisition unit 100 acquires the print data 200 from, for example, the external terminal via the network transmitting and receiving unit 15. In this embodiment, the print data 200 also includes the trimming setting 220. Further, the trimming setting 220 includes data on the position of the cut line to be trimmed after printing.

Alternatively, the data position acquisition unit 100 may acquire the print data 200 from an external recording medium such as a USB memory, a flash memory card, or the like.

Alternatively, the data position acquisition unit 100 may acquire the reception data, which is facsimile-received by the fax transmitting and receiving unit 18, as print data 200.

The data position acquisition unit 100 stores the acquired print data 200 in the storage unit 19.

(Step S101)

Then, the data position acquisition unit 100 performs the cross-section character image acquisition process.

The data position acquisition unit 100 acquires the cross-section drawing data 210.

In the present embodiment, the cross-section drawing data 210 can be acquired by a plurality of methods.

For example, the data position acquisition unit 100 may allow the user to input text and/or an image by using the GUI (Graphical User Interface) of the operation panel unit 16. In this GUI, in the case of text, the font and color can be set. Further, in the case of an image, an image data file may be specified and input. Further, it may be possible to set the setting data of the cross-section drawing data 210 in the GUI. For example, in the cross-section, left-sided, center-sided, or right-sided, and a margin from the top, bottom, left, or right edge can be set.

Alternatively, the data position acquisition unit 100 can also acquire the cross-section drawing data 210 that has already been set in the storage unit 19. For example, when the drawing of the watermark is specified, the data position acquisition unit 100 may acquire the data of the text and/or the image of the watermark as the cross-section drawing data 210.

Alternatively, the data position acquisition unit 100 may acquire data of the affiliation of the user or the print data 200, or the like, as the cross-section drawing data 210 from the account setting stored in the storage unit 19.

Alternatively, the cross-section drawing data 210 set by the external terminal together with the print data 200 may be acquired.

(Step S102)

Then, the cross-section drawing unit 110 determines whether or not the number of pages to be printed is equal to or greater than the specific number of pages. Here, if printing is performed in the number of copies, the cross-section drawing unit 110 may determine whether or not the number of printed sheets of one copy (hereinafter, referred to as the "printed matter") equal to or greater than the specific page. The specific number of pages may be a number of pages having a thickness that can secure a size of the text or the image being visible. For example, as a specific number of pages, about equal to or greater than 100 pages can be set as a practical number of pages. Further, the specific number of pages may be set from the information on the thickness of the recording paper acquired by the cassette sensor 20, the information on the set weight, or the like.

The cross-section drawing unit 110 determines Yes if printing equal to or greater than the specific number of pages. On the contrary, the cross-section drawing unit 110 determines No if the printed matter has less than the specific number of pages.

In the case of Yes, the cross-section drawing unit 110 advances the process to step S103.

In the case of No, the cross-section drawing unit 110 does not print for the cross-section and ends the cross-section drawing process according to the present embodiment. As a result, normal printing is performed.

(Step S103)

If the number of pages is equal to or greater than the specific number of pages, the cross-section drawing unit 110 performs drawing adjustment process.

The cross-section drawing unit 110 adjusts the drawing of the fragment according to the thickness of the recording paper to be printed.

In the present embodiment, the height is measured by the cassette sensor 20 and the paper amount sensor of the recording paper tray, and the drawing in the thickness direction of the printed matter is adjusted. That is, in this example, the cross-section drawing unit 110 calculates where the text and/or the bitmap corresponds to in the thickness direction of the printed matter. This makes it possible to draw precisely.

(Step S104)

Then, the cross-section drawing unit 110 performs the fragment drawing process.

The cross-section drawing unit 110 draws a fragment of the cross-section drawing data 210 in a specific range from the position of the cut line, which is acquired by the data position acquisition unit 100, for each page of the print data 200.

FIG. 4 shows an example of the text as shown in the cross-section where the printed matter 500 is trimmed. In this example of the printed matter 500, a visible text is shown on the cross-section trimmed by the cut line. Here, when trimmed, the text "CONFIDENTIAL" emerges and is viewed.

FIG. 5 shows an example of one page of the above-mentioned printed matter 500 including a fragment of the image printed along the cut line on one side.

The cross-section drawing unit 110 draws the text and/or the image applied to the trimmed position on each page of the print data 200.

The cross-section drawing unit 110 draws, for example, a fragment of the text or the image at a corresponding position within the specific range from the cut line of each page. In this example, the fragment is configured to a series of rectangles that correspond to positions on the cross-section of the text and/or image. That is, the cross-section drawing unit 110 draws the fragment as a rectangle on each page after adjusting the margin and the position according to the trimming setting 220 of the printed matter. The width and the distance from the cut line to a specific range for the rectangle are areas for viewing identifiable text or image after trimming. Further, the distance in this specific range can be set to, for example, about one tenth of an inch to a few fraction of an inch in consideration of the accuracy of trimming.

The cross-section drawing unit 110 can draw these fragments by adding them to each page of the print data 200. At this time, the cross-section drawing unit 110 can be designated to draw the fragment in a darker color than a normal color.

(Step S105)

Next, the cross-section drawing unit 110 performs an image forming process.

The cross-section drawing unit 110 causes the image forming unit 17 to form an image of the print data 200 on which the cross-section is drawn.

Further, the cross-section drawing unit 110 instructs the post-processing device or the post-processing apparatus to perform post-processing according to the post-processing setting of the trimming setting 220. As a result, the printed matter is post-processed. Alternatively, the cross-section drawing unit 110 instructs the display unit of the operation panel unit 16 to indicate the trimming position of the printed matter, or the like, and it may be cut by the user.

This allows the text and/or image drawn with toner, pigment, or ink to be viewed in the trimmed cross-section.

As described above, the cross-section drawing process according to the embodiment of the present disclosure is completed.

As configured in this way, the following effects can be obtained.

In a typical technology, a personal printer capable of borderless printing prints a heading-like mark on the edge of a bundle of paper.

However, many office image forming apparatuses or production printing printers have not been able to print to the edge of the recording paper. Specifically, in such office or production printing, the printed matter has been trimmed after printing.

On the other hand, the image forming apparatus 1 according to the embodiment of the present disclosure includes the data position acquisition unit 100 that acquires the print data 200 and the position of the cut line to be trimmed after printing with the print data 200; and the cross-section drawing unit 110 that draws, for each page of the print data 200, a fragment of text and/or an image visible on trimmed cross-section from the position of the cut line acquired by the data position acquisition unit 100 to a specific range.

With this configuration, the text and/or the image can be visibly printed when the cross-section of the printed matter combined by staples, stitches, ring bindings, or other methods is trimmed. This allows a business or a production printing apparatus to print the text and/or the image identifiable in the cross-section. This can be used to identify printed matter placed on shelves for tracking or other purposes. In addition, there becomes no need to stamp or print with a special printer for printing on the sides.

Further, in the image forming apparatus 1 according to the present embodiment, the cross-section drawing unit 110 draws the fragment when printing equal or greater than the specific number of pages.

With this configuration, fragments on the cross-section are not printed for printed matter having less than the specific page. Therefore, it is not necessary to switch whether or not to print the fragment one by one depending on the number of pages at the time of printing.

Further, in the image forming apparatus 1 according to the present embodiment, the cross-section drawing unit 110 adjusts drawing of the fragment according to thickness of the recording paper to be printed.

With this configuration, the text and/or the image can be drawn, precisely. Therefore, the text can be printed so that it is easier to read. Further, it becomes possible to print a two-dimensional bar code, or the like, which requires strict aspect ratio.

Further, in the image forming apparatus 1 according to the present embodiment, the cross-section drawing unit 110 draws the fragment in a darker color than as usual.

With this configuration, the text and/or the image can be printed in the cross-section so that it is easy to see. That is, even if the fragment is image-formed with matter that does not soak into the recording paper well, such as toner, the text and/or the image drawn on the cross-section becomes easy to see.

[Other Embodiments]

In addition, in the printed matter 500 of FIGS. 3 and 4 of the above-described embodiment, an example in which the text is drawn on the cross-section is described.

However, as described above, the cross-section drawing data 210 may be data including the image such as a bitmap other than text, or the like.

Figure 6:
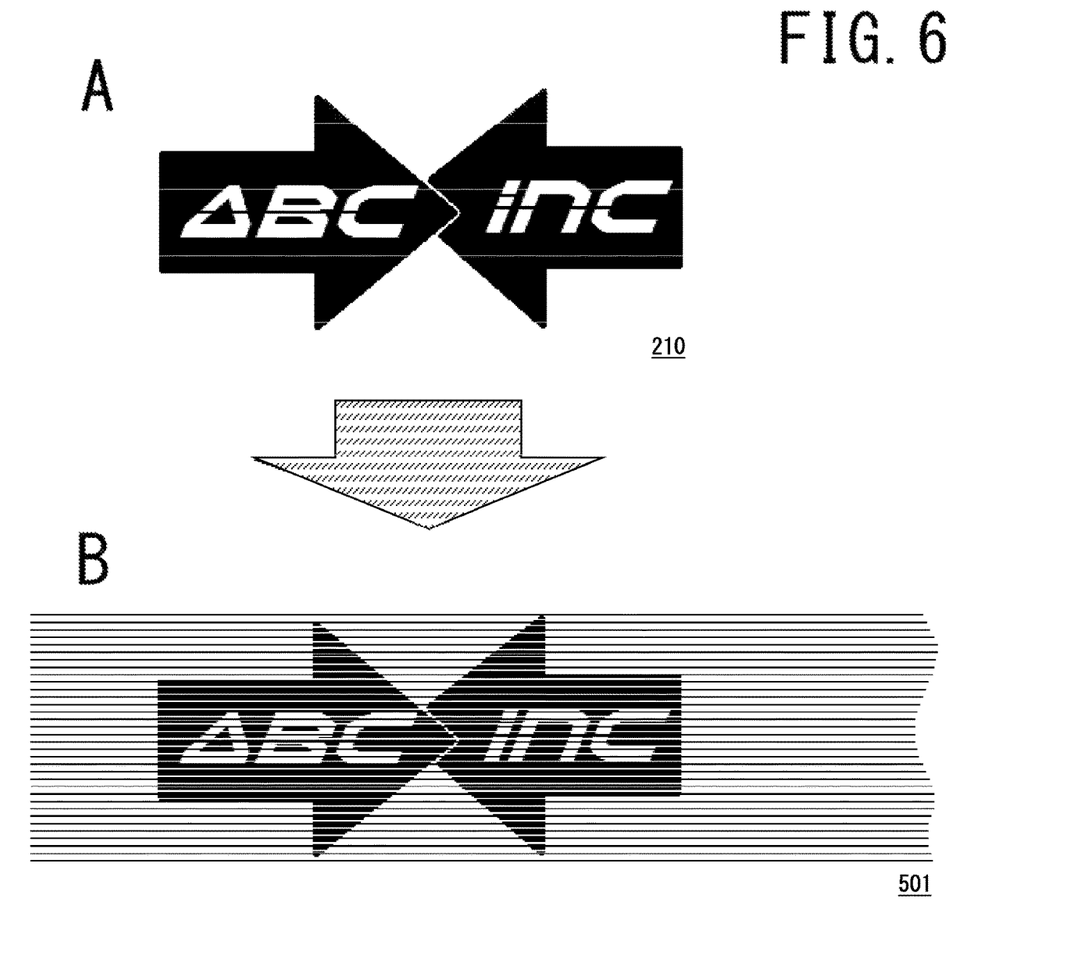
FIG. 6 is a conceptual diagram showing an example of cross-section drawing data according to another embodiment of the present disclosure.

The element "A" in FIG. 6 shows an example of cross-section drawing data 210 of such an image.

The element "B" in FIG. 6 shows an example in which this cross-section drawing data 210 is printed on the printed matter 501. The fragments corresponding to the pixel lines of the bitmap image are drawn on each page. The cross-section drawing data 210 is adjusted, scaled, and drawn as necessary.

This makes it possible to print the bitmap image so that it can be viewed.

In the above-described embodiment, an example of adjusting the drawing according to the height of the recording paper in drawing the text and/or the image has been described.

However, it is not necessary to adjust the drawing by using the height value of the recording paper.

Further, the size and resolution of the text and/or the image drawn on the cross-section may be changed depending on the number of pages.

That is, when the number of pages is large, drawing a larger text and/or image is possible. Alternatively, when the number of pages is small, the text and/or image may be reduced. Even in this case, if the number of pages is too small and the text and/or image cannot be recognized, it is not necessary to print.

Furthermore, when the number of pages is large, the processing load of drawing the fragment may be reduced by lowering the resolution in the height (thickness) direction of the printed matter.

Further, in the above-described embodiment, although the text and/or the image is drawn on one cross-section, the text and/or the image may be drawn on a plurality of cross-sections so as to be viewable. In this case, the text and/or the image may be different for each cross-section.

With this configuration, a case that an index on the side surface of the page and the text and/or the image on the upper surface are drawn may be possible.

Further, in another embodiment of the present disclosure, the cross-section drawing unit 110 may perform display position outside the specific range, which is different from that viewed in the cross-section after trimming at the cut line. That is, the fragment may be drawn so that a different text and/or image is visible if the trimming is made at a position outside of the specific range.

Figure 7:
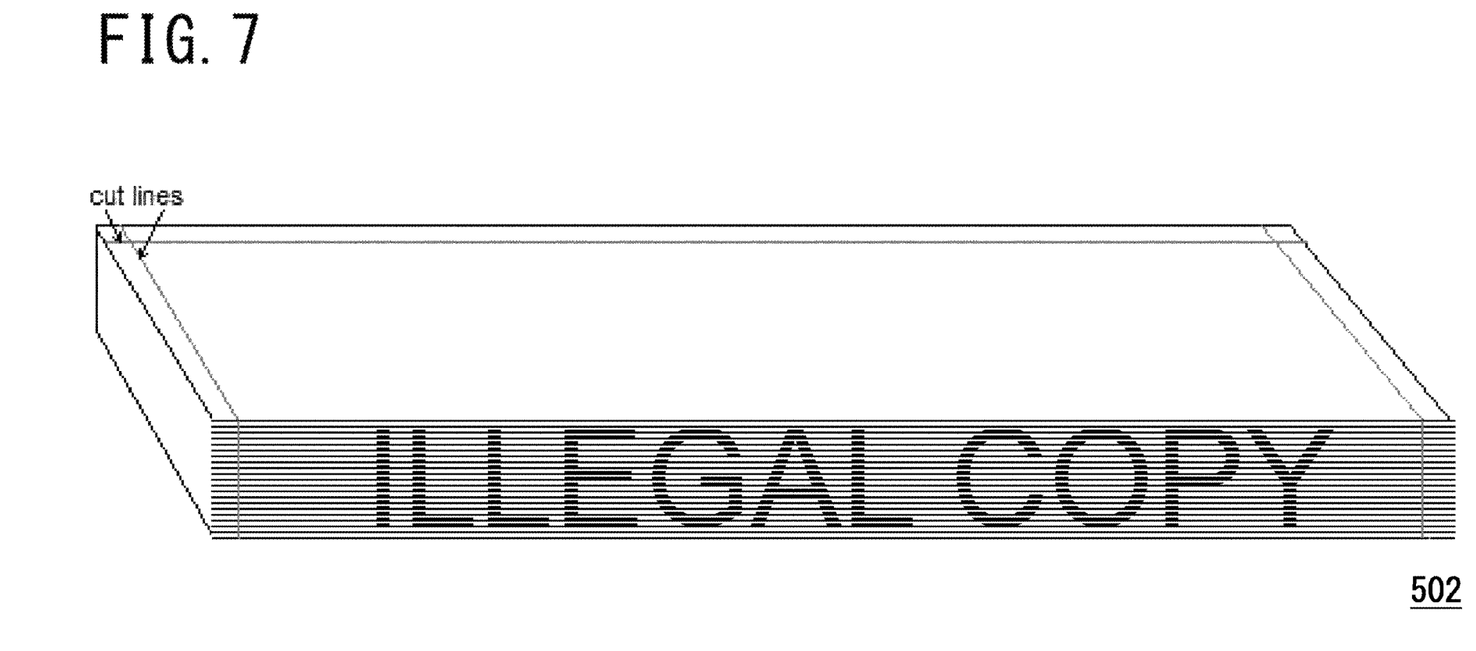
FIG. 7 is a conceptual diagram of drawing a cross-section other than the cut line according to the other embodiment of the present disclosure.

In FIG. 7, in this way, the printed matter 502 shows an example in which the text "ILLEGAL COPY" is visibly drawn if a position other than the cut line is cut.

Figure 8:
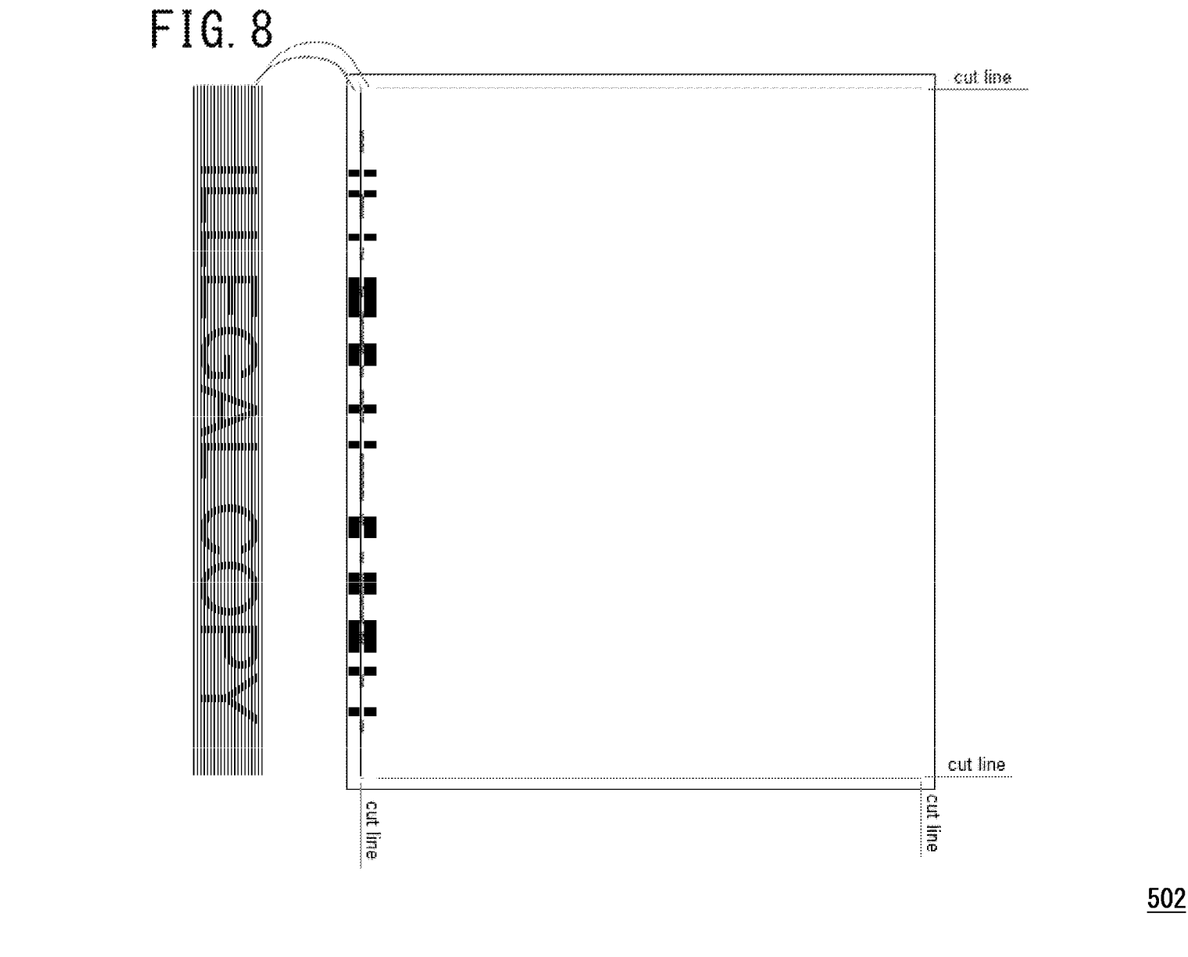
FIG. 8 is a conceptual diagram of drawing a fragment other than the cut line according to the other embodiment of the present disclosure.

FIG. 8 shows an example of a page of this printed matter 502. In the case of this example, if trimming is performed within the specific range of the cut line, the same "CONFIDENTIAL" as in the above example is drawn. However, if trimming is performed both sides outside the specific range from the cut line, "ILLEGAL COPY" indicating that the copy is illegal is viewed.

With this configuration, a printed matter with an intention at the trimmed position can be provided.

For example, when the image is printed by an image forming apparatus other than the one in which the trimming position is set, it can be identified and recognized as an illegal copy, or the like. As a result, security can be enhanced.

Further, by setting a position different from the register mark of the print data 200 as the actual cut line, further enhance of the security can be performed.

Further, in the above-described embodiment, an example of drawing the fragment based on the cross-section drawing data 210 on each page of the print data 200 has been described.

However, this fragment may be PDL data or bitmap image data (hereinafter, referred to as "fragment data") different from the print data 200. In this case, the fragment data may be configured to be superimposed with each page of the print data 200 at the time of image formation. This superimposition can be performed in the same manner as the superimposition of form printing of variable printing or watermark printing.

With this configuration, the fragment can be drawn without changing the print data 200. Further, the drawing of the fragment can be easily changed according to the setting, and various configurations can be supported.

Further, in the above-described embodiment, an example in which the cross-section drawing process is performed by the image forming apparatus 1 has been described.

Figure 9:
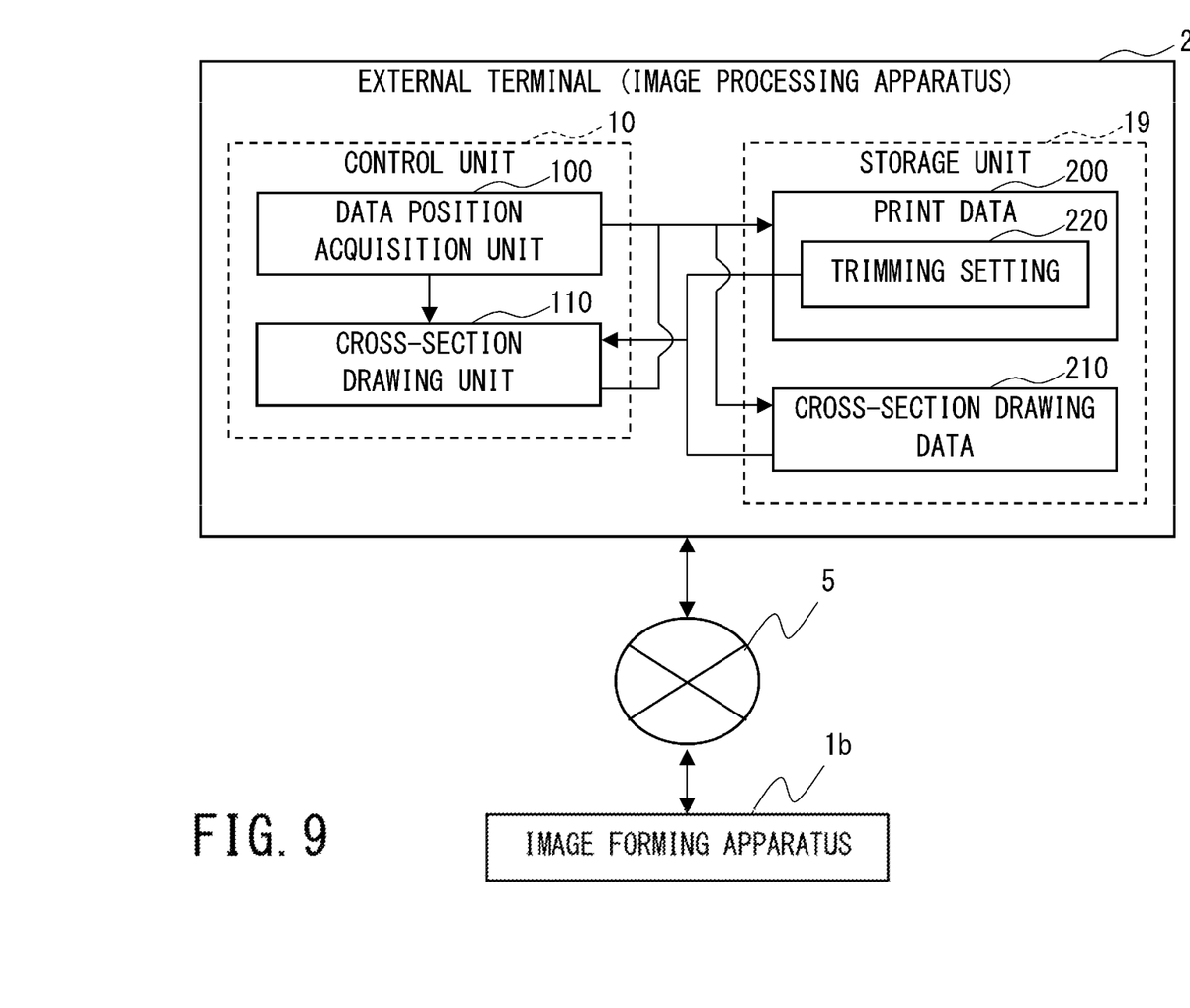
FIG. 9 is a block diagram showing a control configuration of an external terminal according to the other embodiment of the present disclosure.

With reference to FIG. 9, however, it is also possible to use the external terminal 2 as an image processing apparatus to perform cross-section drawing process and transmit the print data 200 on which the cross-section is drawn to the image forming apparatus 1b for printing.

For example, the cross-section drawing according to the above-described embodiment may be executed by the printer driver of the external terminal 2.

In this case, the printer driver is used to set the printing of the cross-section drawing data 210 on the external terminal 2. In this example, a text and/or an image may be input by the GUI of the printer driver of the image forming apparatus 1b during printing. Furthermore, in the GUI of the printer driver, the font, the bitmap file, the position, and the like may be set as in the case of being set by the image forming apparatus 1 according to the above-described embodiment. This bitmap file can be loaded, converted, or the like, by the printer driver. Alternatively, at this time as well, a setting may be made to draw a cross-section as similar to the watermark.

In addition, instead of the external terminal 2, a management server that manages printing for pull-printing, or the like, can be used as an image processing apparatus to perform the same cross-section drawing process.

In such an example, the user selects a print job from the list of jobs on the management server by the external terminal or the operation panel unit of the image forming apparatus. On this, various settings including text and/or image settings similar to those described above can be performed. Here, the management server may also load the bitmap file from the external terminal, or the like.

Further, in the above-described embodiment, an example in which the cross-section drawing process is performed by the image forming apparatus 1 for business is described.

However, a server for print management of industrial printing (production printing) may be used as an image processing apparatus according to another embodiment of the present disclosure to perform the cross-section drawing process.

With reference to FIG. 7, an example of such a production printing system X is described.

Figure 10:
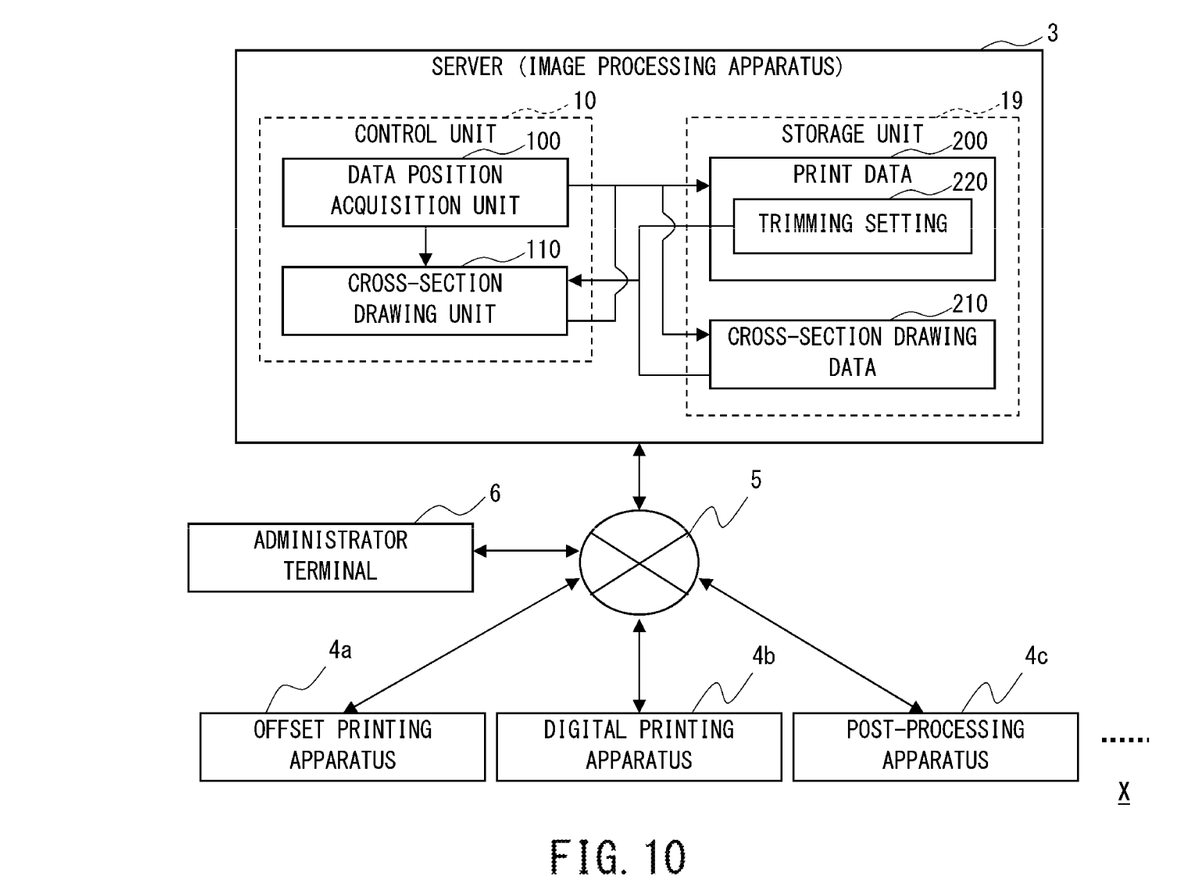
FIG. 10 is a system configuration diagram of a production printing system according to the other embodiment of the present disclosure.

The production printing system X of this example includes a server 3, an offset printing apparatus 4a, a digital printing apparatus 4b, a post-processing apparatus 4c, and an administrator terminal 6, and each apparatus is connected with the network 5.

The server 3 is a server for managing the workflow of production printing. The server 3 is a PC server, a dedicated machine, a general-purpose machine, or the like, installed on a so-called cloud or at a user's place. The server 3 gives an instruction to each apparatus and transmits/receives other information. As a result, the server 3 manages the status of each apparatus, sets jobs, and the like.

The offset printing apparatus 4a is an automated printing apparatus that performs offset printing for printing a large amount (many lots).

The digital printing apparatus 4b is an industrial printer, or the like, that prints a smaller lot than the offset printing apparatus 4a.

The post-processing apparatus 4c is various apparatuses for performing post-processing (after-treatment) such as folding, collating, bookbinding, cutting, or the like, for the recording paper printed by the offset printing apparatus 4a or the digital printing apparatus 4b.

The network 5 is a LAN, a wireless LAN, a WAN, a mobile telephone network, an industrial network, a voice telephone network, other dedicated lines, or the like. The network 5 can send and receive various commands and data to and from each apparatus.

The administrator terminal 6 is a printing administrator's terminal. The administrator terminal 6 accesses the server 3 to allow the administrator to design the print, upload data, create a job, manage a prepress process, check progress, request a process, or the like.

A plurality of these apparatuses may exist depending on the application, the scale of printing, and the like.

Here, an example in which the server 3 performs similar cross-section drawing process as in the above-described embodiment is described.

In this example, the user who may be the administrator executes design or prepress application software (hereinafter, simply referred to as "application") from the administrator terminal 6 to access the server 3.

At this time, a GUI for the cross-section drawing process is displayed by the application, and a text and/or an image can be input, and each setting can be specified. As a result, the fragment is drawn on the print data 200 and transmitted to each apparatus at the time of printing.

Further, the server 3 transmits the trimming setting 220 to the post-processing apparatus 4c to perform trimming at the designated position.

Here, in the production printing, the trimming position may be changed depending on the result of prepress.

In this case, the drawing of the fragment may be changed according to this change. Therefore, as described above, image data for fragments may be prepared, separately, included in the print data 200, and superimposed at the time of printing.

Further, it goes without saying that the configuration and operation of the above-described embodiment are examples, and it can be appropriately modified and executed without departing from the gist of the present disclosure.

What is claimed is:

1. An image processing apparatus comprising:
  a data position acquisition unit configured to acquire print data and a first position of a cut line to be trimmed after printing with the print data; and
  a cross-section drawing unit configured to draw, for each page of the print data, a first fragment of text and/or image visible on a first trimmed cross-section at the first position of a cut line acquired by the data position acquisition unit to a specific range; wherein
  the cross-section drawing unit is further configured to draw a second fragment so that a different text and/or image is visible on a second trimmed cross section at a second position outside the specific range; and
  the different text and/or image is different than the text and/or image visible.

2. The image processing apparatus according to claim 1, wherein
the cross-section drawing unit draws the first fragment when print data has equal or greater than a specific number of pages.

3. The image processing apparatus according to claim 1, wherein
the cross-section drawing unit adjusts drawing of the first fragment according to thickness of recording paper to be printed by accurately measuring height of the recording paper in thickness direction with a cassette sensor.

4. The image processing apparatus according to claim 1, wherein
the cross-section drawing unit draws the first fragment in a darker color than as usual; wherein
the darker color is drawn by dither darkening adjustment or density increasement regardless of eco setting.

5. The image processing apparatus according to claim 1, wherein
the cross-section drawing unit draws so that, when trimming within the specific range, a message indicating as confidential is viewed, and
when trimming on both sides outside the specific range, a message indicating as an illegal copy is viewed.

6. The image processing apparatus according to claim 1, wherein
when the trimming position is to be changed according to a prepress result, the drawing of the fragment is changed according to the change.

7. An image forming apparatus comprising:
a data position acquisition unit configured to acquire print data and a first position of a cut line to be trimmed after printing with the print data;
a cross-section drawing unit configured to draw, for each page of the print data, a first fragment of text and/or image visible on a first trimmed cross-section at the first position of a cut line acquired by the data position acquisition unit to a specific range; and
an image forming unit that forms an image of the print data and the fragment drawn by the cross-section drawing unit for each page; wherein
the cross-section drawing unit is further configured to draw a second fragment so that a different text and/or image is visible on a second trimmed cross section at a second position outside the specific range; and
the different text and/or image is different than the text and/or image visible.

8. The image forming apparatus according to claim 7, wherein
the cross-section drawing unit draws the first fragment when print data has equal or greater than a specific number of pages.

9. The image forming apparatus according to claim 7, wherein
the cross-section drawing unit adjusts drawing of the first fragment according to thickness of recording paper to be printed.

10. The image forming apparatus according to claim 7, wherein
the cross-section drawing unit draws the first fragment in a darker color than as usual.

11. The image forming apparatus according to claim 7, wherein
the cross-section drawing unit draws, in places outside the specific range, a fragment so that text and/or image different from that viewed in the trimmed cross-section is viewed.

12. An image processing method executed by an image processing apparatus, comprising the steps of:
acquiring print data and a first position of a cut line to be trimmed after printing with the print data;
drawing, for each page of the print data, a first fragment of text and/or image visible on a first trimmed cross-section at the acquired first position of a cut line to a specific range; and
drawing a second fragment so that a different text and/or image is visible on a second trimmed cross section at a second position outside the specific range, wherein the different text and/or image is different than the text and/or image visible.

13. The image processing method according to claim 12, wherein drawing the first fragment comprises:
drawing the first fragment when print data has equal or greater than a specific number of pages.

14. The image processing method according to claim 12, further comprising:
adjusting drawing of the first fragment according to thickness of recording paper to be printed.

15. The image processing method according to claim 12, wherein drawing the first fragment comprises:
drawing the first fragment in a darker color than as usual.

16. The image processing method according to claim 12, further comprising:
drawing, in places outside the specific range, a fragment so that text and/or image different from that viewed in the trimmed cross-section is viewed.

* * * * *